(12) United States Patent
Christian

(10) Patent No.: US 10,308,441 B2
(45) Date of Patent: Jun. 4, 2019

(54) BASE FOR CONVEYOR BELT SCRAPER

(71) Applicant: BRELKO PATENTS (PTY) LTD, Johannesburg (ZA)

(72) Inventor: Paul Christian, Johannesburg (ZA)

(73) Assignee: BRELKO PATENTS (PTY) LTD., Johannesburg (ZA)

( * ) Notice: Subject to any disclaimer, the term of this patent is extended or adjusted under 35 U.S.C. 154(b) by 0 days.

(21) Appl. No.: 15/750,034

(22) PCT Filed: Jun. 14, 2016

(86) PCT No.: PCT/ZA2016/050020
§ 371 (c)(1),
(2) Date: Feb. 2, 2018

(87) PCT Pub. No.: WO2017/024324
PCT Pub. Date: Feb. 9, 2017

(65) Prior Publication Data
US 2018/0222687 A1 Aug. 9, 2018

(30) Foreign Application Priority Data
Aug. 4, 2015 (ZA) .................... 2015/05594

(51) Int. Cl.
*B65G 45/12* (2006.01)
(52) U.S. Cl.
CPC .................... *B65G 45/12* (2013.01)

(58) Field of Classification Search
CPC ........................................... B65G 45/12
USPC ................................... 198/497, 499
See application file for complete search history.

(56) References Cited

U.S. PATENT DOCUMENTS

| | | | | |
|---|---|---|---|---|
| 4,953,689 A * | 9/1990 | Peterson | ............... | B65G 45/16 15/256.51 |
| 5,301,797 A * | 4/1994 | Hollyfield, Jr. | ......... | B65G 45/16 198/499 |
| 5,979,638 A * | 11/1999 | Wiggins | ................ | B65G 45/12 198/497 |
| 6,581,754 B2 * | 6/2003 | Law | ..................... | B65G 45/12 15/256.51 |
| 9,242,805 B2 * | 1/2016 | DeVries | ................ | B65G 45/12 |
| 9,340,366 B2 * | 5/2016 | Peterson | ............... | B23K 26/38 |
| 9,738,456 B1 * | 8/2017 | Grimm | ................. | B65G 45/16 |
| 2003/0066737 A1 * | 4/2003 | Malmberg | | |
| 2006/0021854 A1 * | 2/2006 | Waters et al. | | |
| 2009/0032371 A1 * | 2/2009 | Hoessl | | |
| 2011/0067197 A1 | 3/2011 | Mott et al. | | |

FOREIGN PATENT DOCUMENTS

CN  103662741 A  3/2014
DE     2702841 A1  7/1977

* cited by examiner

*Primary Examiner* — Douglas A Hess
(74) *Attorney, Agent, or Firm* — Tutunjian & Bitetto, P.C.

(57) ABSTRACT

A conveyor belt scraper (40) which includes a base (10) and a scraper element (42) which is molded to the base (10).

8 Claims, 3 Drawing Sheets

BASE FOR CONVEYOR BELT SCRAPER

BACKGROUND OF THE INVENTION

This invention relates generally to a conveyor belt scraper and more particularly to a base for use with a conveyor belt scraper.

One type of conveyor belt scraper is made from a tough, resiliently deformable, material such as polyurethane. Typically, this type of belt scraper, which is integrally moulded, has a retention formation which is engageable with a sliding action with a suitable channel in a holder. Some properties which make polyurethane suitable for use as a scraper can however, present problems during installation and recovery of the scraper, when worn. This is because the polyurethane is "sticky" and tends to cling to a holder, resisting relative sliding movement.

Another type of scraper has a base which is square in cross-section and which is positioned inside a tubular holder which is also of square cross-section. There is an offset between the base and the holder so that, inside the holder, four triangular voids are formed at respective corners of the holder. Each void is occupied by a compressible rubber insert. The positioning of each rubber insert can be arduous for, usually, it is necessary to freeze each insert, using liquid nitrogen, so that the insert can be placed in position. The use of liquid nitrogen is expensive, and assembly of the base requires a fair amount of labour.

An object of the present invention is to address, at least to some extent, the aforementioned factors.

SUMMARY OF THE INVENTION

The invention provides a base for a conveyor belt scraper, wherein the base has an elongate body of uniform cross-section which includes a bridging piece with a first side and a second side which is opposed to the first side, first and second spaced apart legs on the first side of the bridging piece and at least two spaced apart retention sections on the second side of the bridging piece.

Each retention section may, in cross-section, be of rectangular form. This is preferred but non-limiting. The retention sections may differ in size or shape. A first retention section on the second side of the bridging piece may be flanked by second and third retention sections which are respectively spaced from the first retention section and which extend from the second side. The second and third retention sections may be smaller than the first retention section.

At least one retention section may include a number of keying formations. In one form of the invention each keying formation is a respective hole which extends through the retention section. Alternatively each keying formation may respectively comprise a recess in, or an enlarged portion of, the retention section. The invention is not limited in this respect.

The keying formations may be adapted to bond to a material which, in use, is moulded to the body.

The body may be made from a suitable material, e.g. a hard material which allows the base to be slid into engagement with a holder, or to be slid out of engagement with a holder, with relative ease. The body may, for example, be made from a non-ferrous material (to counter the effects of corrosion) or from a plastics material, e.g. a suitable nylon which is reinforced with glass or the like. This is exemplary only and non-limiting.

The body may be formed from an elongate extrusion which is cut, as appropriate, to a suitable length. Alternatively the body may be formed in a moulding or other process.

If the keying formations are holes then these may be formed in a drilling or punching step or the like.

The invention further extends to a conveyor belt scraper which includes a base of the aforementioned kind and, fixed to the body of the base, and thereby adhering to the body, a scraper element which comprises a scraper member which terminates in a scraping end or which has provision for a scraping blade to be attached to it.

The scraper member may be moulded to the body.

The scraper member may be made from a material which is more flexible than a material (typically polyurethane) used to make the body. Preferably, the construction of the conveyor belt scraper is such that the scraper member is integrally moulded over the base so that, for all practical purposes, a conveyor belt scraper of unitary construction is provided.

In a different form of the invention the scraper member is secured to the body using appropriate fasteners which engage with the scraper member and with the keying formations.

BRIEF DESCRIPTION OF THE DRAWINGS

The invention is further described, by way of example, with reference to the accompanying drawings in which.

DESCRIPTION OF PREFERRED EMBODIMENT

Figure 1:
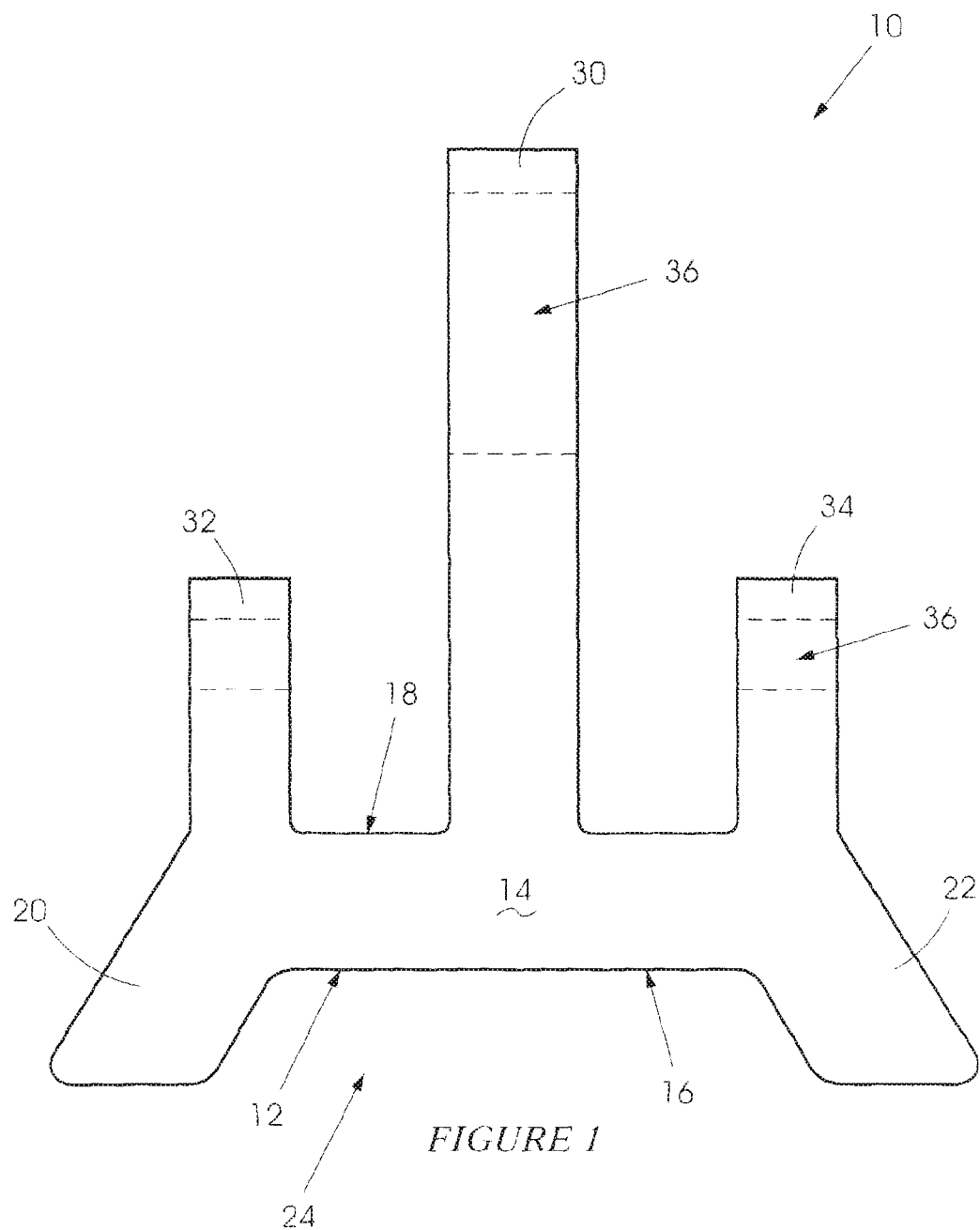
FIG. 1 is a view in cross-section of a base for a conveyor belt scraper according to the invention.
Figure 2:
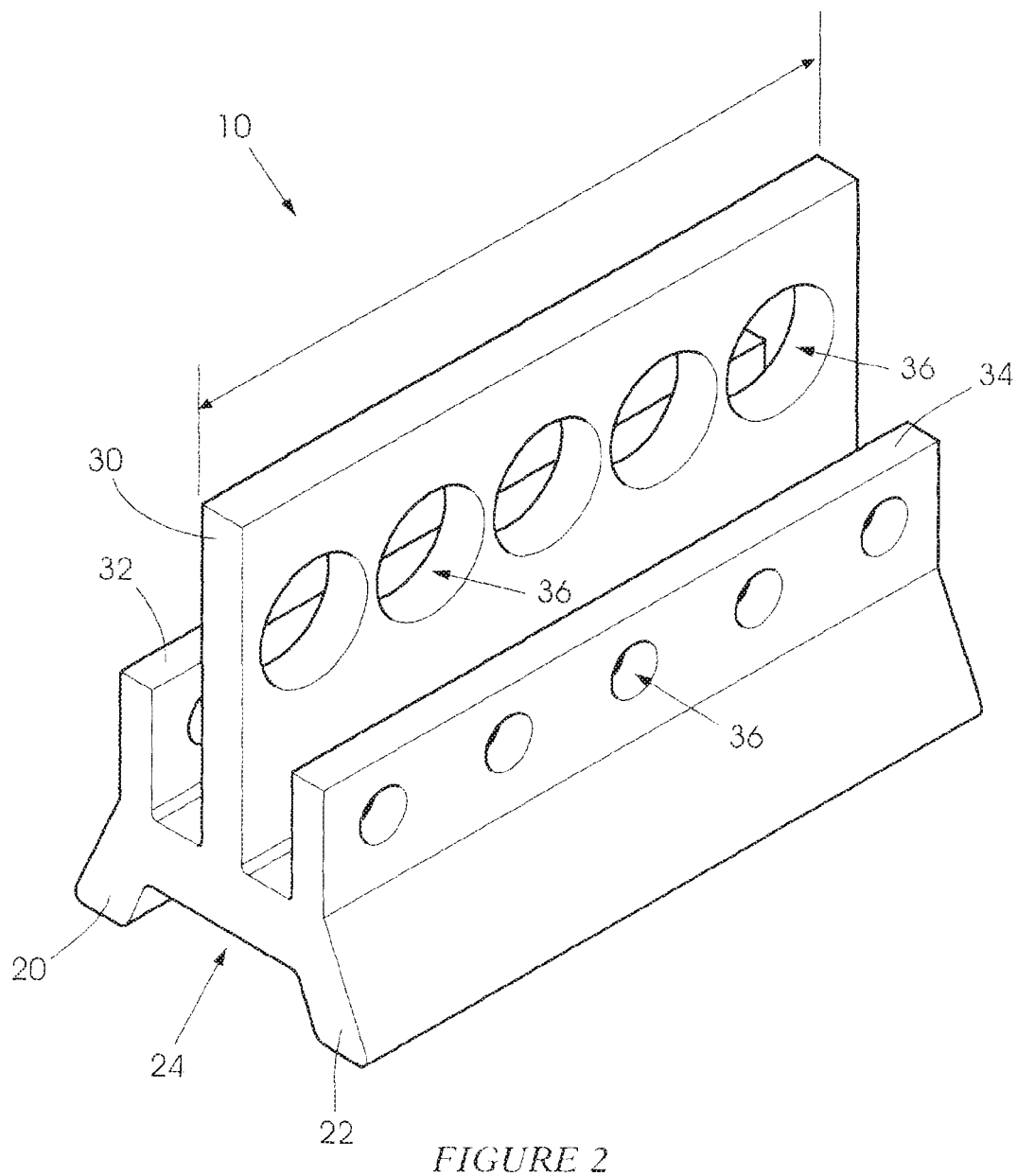
FIG. 2 is a perspective view of the base shown in FIG. 1.

FIG. 1 and FIG. 2 are a view in cross-section and a perspective view, respectively, of a base 10 for a conveyor belt scraper according to the invention.

The base 10 includes a body 12 with a bridging piece 14 which has a first side 16 and a second, opposed side 18. First and second, spaced apart, diverging legs 20 and 22 respectively, which define a gap 24 between them, project from the first side 16.

Three retention sections 30, 32 and 34 respectively extend from the second side 18, away from the legs 20 and 22. Each retention section, in outline as shown in FIG. 2, is generally rectangular. The section 30 is centrally positioned on the second side 18 and is the largest of the three sections. The sections 32 and 34 are spaced from the section 30 and are, in effect, at respective opposed extremities of the bridging piece 14.

Each retention section is formed with a respective number of keying formations in the form of holes 36 which extend transversely through the respective section. The holes 36 in the section 30 are larger than the holes 36 in the sections 32 and 34. The holes 36 are formed in any appropriate manner, e.g. by means of a drilling process. Alternatively the holes 36 can be formed during a moulding process, if the body 12 is moulded. The invention is not limited in this respect.

The body 12 can be formed in any suitable way, e.g. in a moulding process or from a suitable extrusion which is cut to length as required. The body has a length 38 (see FIG. 2) which is determined to accommodate the dimensions of an existing scraper holder.

The body 12 is preferably made from a corrosion-resistant metal, or from a hard plastics material.

Figure 3:
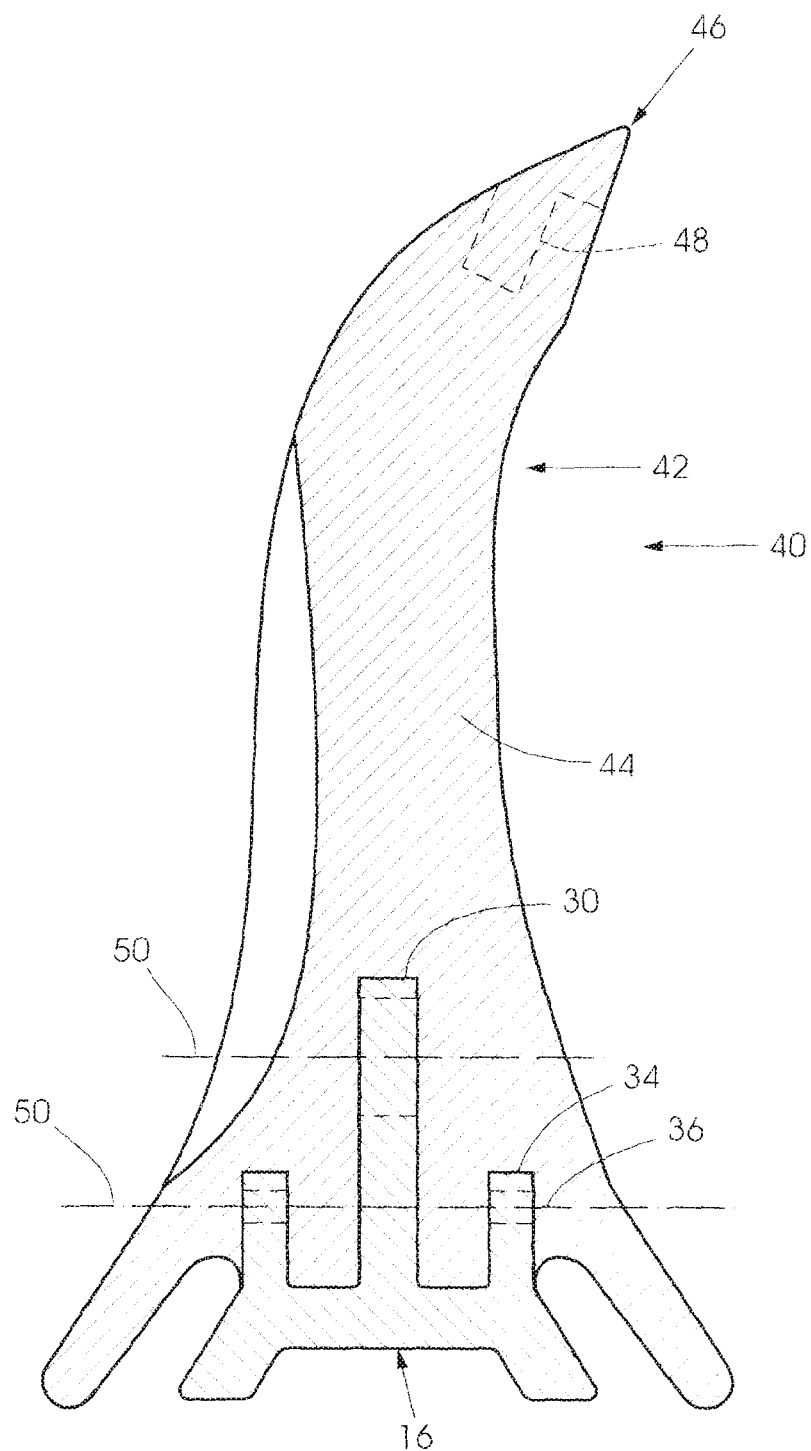
FIG. 3 illustrates in cross-section a conveyor belt scraper made using the base shown in FIG. 1.

FIG. 3 illustrates a conveyor belt scraper 40 which is made using the body 12 shown in FIGS. 1 and 2. The body 12 is inserted into a suitable mould and, using an injection moulding process, a scraper element 42 is formed by over-moulding a scraper member 44 onto the body 12. The member 44 typically is made from a polyurethane material which has properties which make it highly suitable for use as a scraping element. A leading edge 46 of the scraper member 44 defines a scraping surface. Alternatively, the leading edge 46 is shaped, eg. with an elongate slot 48, shown in dotted outline, to receive a scraper blade (not shown).

The material which makes up the member 44 penetrates the holes 36 during the moulding process. The scraper member 44 is thereby secured to the body 12 in a manner which ensures that, for practical purposes, the member 44 cannot be detached from the body 12. The base 10 and the scraper element 42 thereby form an integral, composite conveyor belt scraper.

In a different form of the invention a scraper element, similar to that shown in FIG. 3, is attached to the body using fasteners, notionally indicated by dotted lines 50 in FIG. 3 which pass through holes in the scraper member 44 which are brought into register with corresponding holes 36 in the body.

The arrangement shown in FIG. 3 means that the use of the square base and holder described in the preamble hereof, and the use of liquid nitrogen to enable rubber inserts to be located into the triangular voids referred to, are not required.

The invention claimed is:

1. A conveyor belt scraper comprising:
   a base comprising
      an elongate body of uniform cross-section having a bridging piece with a first side and a second side opposed to the first side,
      first and second spaced apart legs on the first side of the bridging piece; and
      at least two spaced apart retention sections on the second side of the bridging piece in such that the first and second legs project from the first side and are divergent and in that the retaining formations extend from the second side, away from the legs; and
   a scraper element formed by over-moulding the same onto the body and over the at least two spaced apart retention sections of the body.

2. The conveyor belt scraper according to claim 1, wherein the at least two spaced apart retention sections comprise a first retention section, a second retention section, and a third retention section, and wherein the first retention section on the second side of the bridging piece is flanked by the second and third retention sections which are respectively spaced from the first retention section and which extend from the second side at respective opposed extremities of the bridging piece.

3. The conveyor belt scraper according to claim 2, wherein the second and third retention sections are shorter than the first retention section in the direction of extension from the second side.

4. The conveyor belt scraper according to claim 2, wherein only the retention sections are over-moulded by the scraper member.

5. The conveyor belt scraper according to claim 1, wherein at least one retention section includes a number of keying formations which are adapted to bond to a material used to form and being over-moulded onto the base.

6. A conveyor belt scraper comprising:
   a base comprising
      an elongate body of uniform cross-section having a bridging piece with a first side and a second side opposed to the first side,
      first and second spaced apart legs on the first side of the bridging piece; and
      a first retention section, a second retention section, and a third retention section, and wherein the first retention section on the second side of the bridging piece-is flanked by the second and third retention sections which are respectively spaced from the first retention section and which extend upward from the second side of the bridging piece; and
   a scraper element formed by over-moulding the same onto the body and over the first, second and third retention sections of the body, wherein at least one of said first second and third retention sections includes a number of keying formations which are adapted to bond to a material used to form the scraper element.

7. A conveyor belt scraper comprising:
   a base comprising
      an elongate body of uniform cross-section having a bridging piece with a first side and a second side opposed to the first side,
      first and second spaced apart legs on the first side of the bridging piece; and
      a first retention section, a second retention section, and a third retention section, all of which extend upward from the second side of the bridging piece; and
   a scraper element formed by over-moulding the same onto the body and over the first, second and third retention sections such that no portion of any of the retention sections is exposed after the scraper element is formed.

8. The conveyor belt scraper according to claim 6, wherein the second and third retention sections are straight and entirely enclosed within the scraper after the same is formed by over-moulding.

* * * * *